Figure 1:
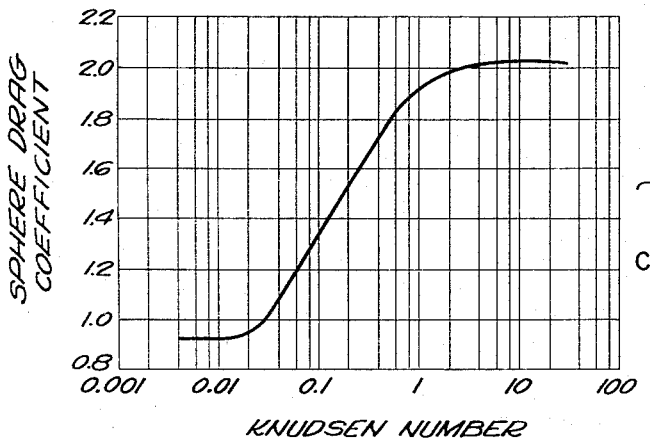

Dec. 20, 1966  B. V. RHODES ET AL  3,292,432

SPACE ENVIRONMENT SENSOR

Filed March 28, 1961

INVENTORS
BARRY V. RHODES
DANIEL E. BLOXSOM, JR.

BY

ATTORNEY

United States Patent Office 3,292,432
Patented Dec. 20, 1966

3,292,432
SPACE ENVIRONMENT SENSOR
Barry V. Rhodes, 22358 Baltar St., Canoga Park, Calif. 91304, and Daniel E. Bloxsom, Jr., 523 S. Lucerne, Los Angeles, Calif. 90005
Filed Mar. 28, 1961, Ser. No. 98,920
6 Claims. (Cl. 73—180)

This invention relates to space environment sensing devices and more particularly to automatic equipment for determining physical quantities and characteristics, such as ambient temperature, velocity, object attitude relative to a specific reference object, etc., in gaseous environments characterized by free flow of molecules. By the latter is meant an environment in which the absolute pressure of the gas is of such low order of values that the mean free distance between molecules of the ambient gas is comparable to distances measurable by ordinary hand-manipulated "measuring" devices. Environmental conditions of the character indicated are present, for example, at elevations of the order of from 100,000 feet to 400,000 feet outward from the surface of the earth. In such an environment the gas is considered to have "granularity" or to be characterized by granular flow when displaced by an object moving through the gas.

It is known that the usual or conventional instruments for obtaining values of physical characteristics or measures, such as altimeters for measurements of altitude, thermometers for determining temperature, etc., do not furnish accurate or reliable indications when the ambient gaseous pressure is of the order of the low values obtaining at distances greater than about 100,000 feet from the surface of the earth.

In connection with the operation of vehicles in the space outside the stratosphere, for example, it is very desirable to have simple and inexpensive, lightweight means capable of furnishing or permitting determinations of absolute pressure, velocity, temperature, and altitude relative to the earth or other reference object. Also, it is desirable to have means possessing the aforementioned characteristics that may in part serve as essential components of a vehicle, and that are of such character as to provide direct discrete indications readily usable by automatic means, such as computers, for determining by reference to established data, a plurality of types of desired data. Especially it is desirable that a single type of sensor means furnish the required measures or data for a plurality of different kinds of information. For example, it is desirable that an essential vehicle component, such as a nose, serve also as a component of a system for providing indications of attitude, vehicle speed, vehicle velocity, ambient gas temperature, etc., and that the indications furnished be, for example, electrical in character, whereby by simple means the indications may be transformed into digital data susceptible of being introduced into and operated upon by a digital data processor.

The present invention provides means comprising a plurality of preferably spherical members of known or calibrated characteristics that, in use, are so situated on a vehicle as to be exposed to the ambient gaseous medium, and respective supporting means for the members, the supporting means each including three-dimensionally-responsive electrical strain-gage transducers and appurtenances, the components being constructed and arranged to provide respective continuous sets of signals (each set comprising three signals) representing forces exerted upon the respective spheres in each of three mutually normal directions. Further, there are provided means for utilizing the produced sets of signals. The latter means comprise signal translating means for translating the respective signals and effecting comparisons of the signals within each set and providing for each member a digital output signal representing a mathematical function of relative magnitudes of the three translated strain-gage signals, and computer and appurtenant means for performing programmed operations including comparing the data comprised in the three digital output signals with stored predetermined reference data and for providing and utilizing computer output signals for controlling or operating indicating devices for indicating values of such physical quantities as Mach number, vehicle attitude, vehicle altitude, ambient gas temperature, and the like.

The aforementioned members are either carefully prepared and precisely dimensioned replicas of experimentally tested and calibrated members, or are the latter members themselves. By known experimental techniques, data in respect of the several mentioned physical quantities are accumulated under various controlled environmental conditions, using the aforementioned preferably spherical members or probes. The data thus established are recorded and stored in the computer data store or memory for use as standard or reference information in the data-comparison portion of the computer routine. The computer (which operates according to a prepared routine administered by the computer program controller) makes continuous comparisons of translated strain-gage input information or data with the reference data and produces appropriate output signals to respective instruments for indicating Mach number, vehicle attitude, vehicle altitude, ambient gas temperature, etc.

It is, accordingly, a prime object of the invention to provide means for determining and/or providing an indication of Mach number (velocity in terms of speed of sound in the ambient gaseous medium), altitude, attitude, temperature, gas density, and related quantities, either alone or with one or more of the others, in a nonterrestrial environment.

Another object of the invention is to provide means of the character indicated that are capable of providing accurate indications of the mentioned physical quantities irrespective of changes in attitude with respect to a reference object.

Another object of the invention is to provide reliable means for providing accurate physical data during movement in a region between the gasdynamic region and the free molecular gas flow region adjacent a planet of a solar system.

Figure 2:
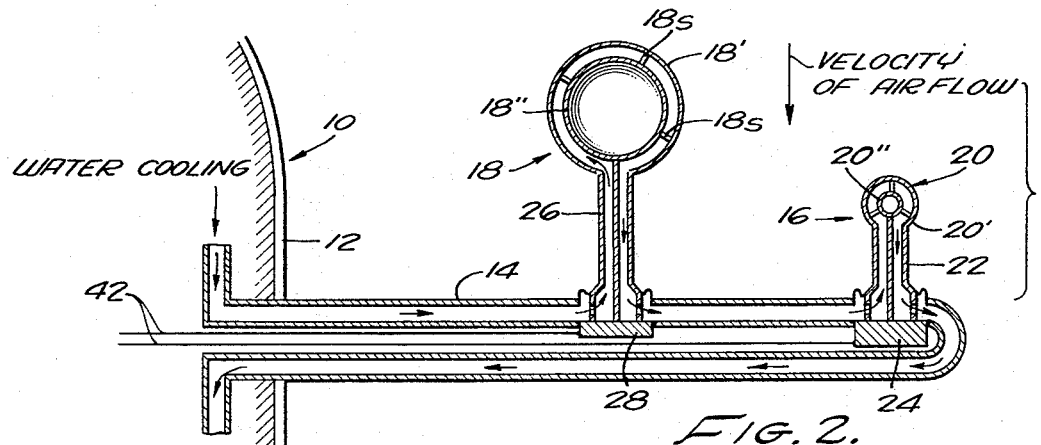
Figure 3:
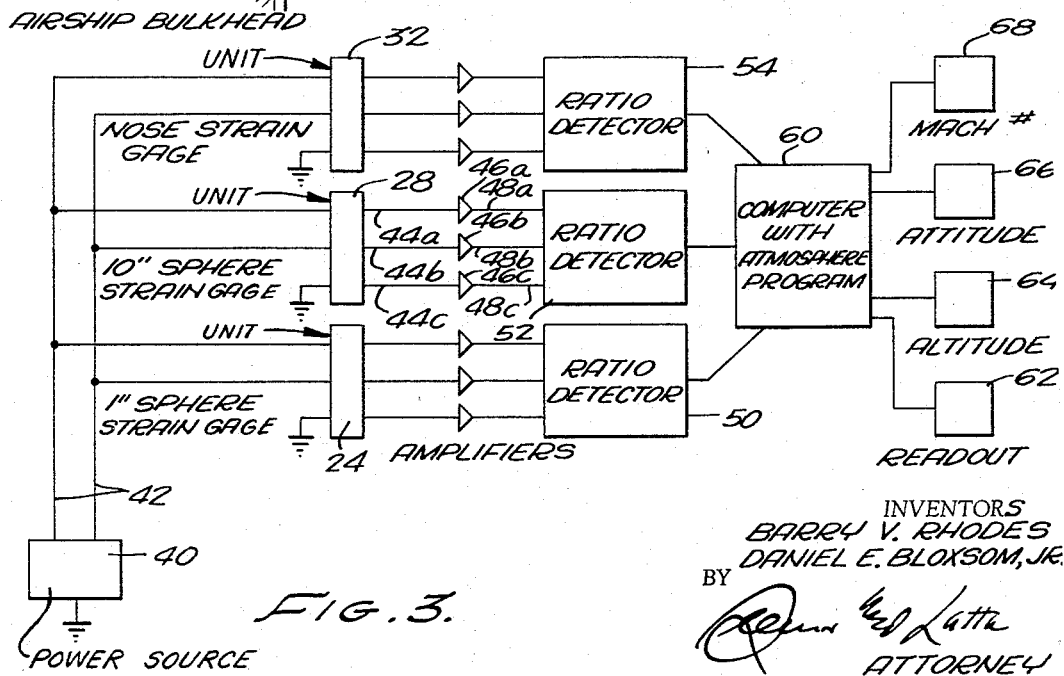

Other objects and advantages of the invention will hereinafter be made apparent or will become apparent from consideration of the appended claims and the following description of exemplary apparatus arrangements according to the invention. The exemplary apparatus arrangements and appurtenant auxiliary graphical representations are depicted in the accompanying drawings, in which:

FIGURE 1 is a graphical representation depicting experimentally establishing relationships between sphere drag coefficient and Knudsen number, for a typical spherical probe operating in a gaseous medium under appropriate environmental restrictions;

FIGURE 2 is a partly schematic diagram illustrating a means and mode of mounting probe and gage means, and appurtenant apparatus, on a vehicle the nose portion of which is utilized as a primary spherical member; and FIGURE 3 is a schematic diagram illustrating the functional concatenation and organization of information-translating-processing means and physical value indicating means, according to the invention.

The exemplary illustrative sensor system according to the invention provides measures of aerodynamic parameters such as mean free-path of the gas molecules in the ambient medium, vehicle attitude, and velocity, utilizing determinations of the respective forces per unit area (dynes/cm.$^2$, for example) exerted in each of three mutually normal directions upon spherical bodies of differing dimensions. While probe members of other configurations may be utilized under restricted conditions, spherical members are preferred because of ease of mounting, structural stability, and their geometrical insensitivity to angle of attack. The individual spherical members are mounted upon individual slender supports in such a manner as normally to present a completely hemispherical face in the direction of movement of the vehicle. Each support is in turn supported by a respective triple-axis strain-gage balance in which each strain-gage is sensitive to force exerted thereon in only a respective one of three mutually normal directions. Through experimental trials and operations in gaseous media of differing compositions and using spheres of the several different diameters in wind tunnels of the so-called hot-shot type and of appropriate diameters, and performing the experiments at each of a group of pressures, there have been calculated a set of drag coefficients for various Knudsen numbers for each gaseous medium employed. This known data or information may be graphically plotted, as, for example, in FIGURE 1 of the drawings, for a plurality of gases for better visual inspection and comparison. The drag coefficients may be calculated using the equation:

$$C_D = C_C + \frac{(C_{FM} - C_C)}{\frac{.117}{\rho \overline{Kn}}}$$

in which $C_D$ is the drag coefficient of a sphere and is equal to $2F_D/\rho V^2 A$, A being the projection or cross-sectional area of the sphere, $F_D$ the drag force on the sphere, $\rho$ the density of the gas, V the relative velocity, $C_{FM}$ the drag coefficient of a sphere in free-molecule flow (or 2.000), $C_c$ the drag coefficient of the sphere in gas-dynamic environment, and $Kn$ the Knudsen number (mean free path of gas molecules divided by sphere diameter).

The calculated data are, as indicated, obtained with respect to Knudsen numbers of a range extending beyond the range of appreciable change of drag coefficient, and are introduced into the memory of a computer for comparison purposes. The experimental techniques employed for determining the necessary measures for the data for storage are known in the art and hence will not be further explained.

From a consideration of the formulas or mathematical definitions of the drag coefficient, equating the two gives a formula for $F_D$ in terms of three varying factors-velocity, density, and Knudsen number. Since both of the latter two factors vary with the mean free path of the gas molecules, the force on any one of the spheres may be expressed in terms of two of the variables. Thus, with respective drag forces on a plurality of spheres of different sizes being simultaneously fed into the computer, unique values of velocity and of mean free path of the gas molecules are readily computed. And since the gas temperature, altitude, density and speed of sound are all functions of the mean free path of the gas molecules, each of the former factors may be expressed in terms of the mean free path. Additionally, Mach number being a function of velocity of the vehicle and velocity of sound in the ambient, the computer may readily compute and furnish an output representing Mach number.

Referring now to FIGURE 2, an outer wall 12 of a vehicle 10 (shown only in part) is illustrated in fragmentary section and with a rigid mount 14 extending outwardly from a firm anchorage (not shown) within the vehicle. The particular form and manner of attachment of mount 14 are selected, as are the material and construction of the mount, to provide a very rigid means upon which spherical probe devices or means may be mounted or secured. The mounted probe devices, herein designated by ordinals 16 and 18, respectively, include in each instance a fluid-cooled generally hollow spherical structure, a rigid column or support, and a tri-axial strain-gage balance that is firmly secured to mount 14.

As shown, probe 16 comprises a double or concentric shell spherical nose 20 formed essentially of outer and inner shells 20', 20" between which a coolant fluid is circulated. As indicated, the nose 20 of probe 16 is positioned and supported by a rigid strut 22 whose internal structure provides paths for the coolant fluid. The directions or courses of flow of the coolant fluid may be as indicated by the arrows in the strut; and the coolant is appropriately supplied through duct or conduit means within mount 14 as similarly indicated. Strut 22 is supported by a tri-axial strain-gage balance 24 that is in turn rigidly secured to mount 14. Flexible seal means between the ducts or conduits in strut 22 and those in mount 14 permit of proper operation of the strain-gage balance as nose 20 is subjected to forces in either or all of the three directions in which applied forces are exhibited when the vehicle is in motion.

A second and similar, but larger, calibrated spherical probe 18 comprises an outer spherical shell 18' and an inner shell 18" spaced by spacers 18s, the shells being supported by a rigid strut 26 of construction and arrangement similar to those of strut 22. Strut 26 is likewise supported by a tri-axial strain-gage balance 28 that is rigidly secured to mount 14. The construction and arrangement of mount 14 and probe devices 18 and 20, including their appurtenant supporting struts and strain-gage means, are such that the spherical noses may be maintained within desired temperature limits by coolant supplied thereto via duct means in the struts and mount, and are such that forces applied to the noses are effectively transduced by the respective strain-gage balances into respective sets of three signals each. Each generated signal represents a respective component of force in one of three mutually perpendicular directions. The source of energy for the strain-gages, and the electrical connections thereto are not shown in detail, in the interest of simplicity of disclosure, since those means are not per se the present invention and are known in the art.

Not shown in detail in FIGURE 2 but arranged to support the leading or nose-shell of the vehicle 10, is a third tri-axial strain-gage balance 32 (indicated schematically or functionally in FIGURE 3) that may be arranged in a disposition similar to that of similar balances 24 and 28. The nose-shell of the vehicle is carefully dimensioned and is pre-tested and measured to provide data for storage in the manner previously described. Thus, the shell may serve as a third spherical probe device whose strain-gage balance provides a third set of three signals.

Referring specifically to FIGURE 3, there are indicated in block diagram form a group of electrical strain-gage balances 24, 28 and 32, each supplied power from a power source 40 by way of line 42 and each constructed and arranged to provide signals on a respective set of three output lines such as lines 44a, 44b and 44c connected to balance 28. It will be understood that in operation the output signal on any line may at times have zero value or be of opposite phase or polarity from other output signals, depending upon the relative positions and motions of the probes. Each set of output lines is connected to feed its signals into a respective set of amplifier means, such as amplifiers 46a, 46b and 46c; and each set of amplifiers is connected and arranged to pass the amplified or translated signals over respective lines such as lines 48a, 48b and 48c, to a respective signal ratio detector, such as that represented at 52.

Each ratio detector is effective to produce output signals comprising the strain-gage signals and a signal representing the vectorial resultant of the three drag-force-representing signals supplied to it by its associated tri-axial strain-gage unit. The ratio detector output signals are in the case of each of the detectors transmitted over a respective communication line to the computer 60. As is evident each communication line may be a direct wire line if the computer is on board the vehicle, or it may be a telemetry channel in those instances or cases wherein the computer is situated elsewhere, as on earth. The signals received by the computer over the communication lines provide data utilized by the computer for comparison with stored data, and for mathematical operations such as computing the difference between the drags on two of the spherical probes. Computer 60 has a stored program and contains in its memory or information store the pre-calculated and determined data such as are graphically represented in FIGURE 1. In accord with the repetitive sequence of the stored program, the computer receives samples of the respective force-indicating signals from detector units 50, 52 and 54, in sequence, and compares the values with stored data sequentially in conventional comparison mode until input data-stored data match is attained, and in accord therewith provides output signals to respective indicator device units 62, 64, 66 and 68, in rapidly repeated sequence. As is evident from the preceding statements respecting telemetry of data to computer 60, and as is evident to those skilled in astronautics, if the computer is carried on the vehicle its output may be telemetered prior to application to the indicating instruments.

Since in an environment of determined characteristics the velocity of the vehicle is a function of the difference in the force per unit of projected area as evidenced on spheres of different dimensions, it is evident that with families of data obtained experimentally using probes 18, 20 and the vehicle nose and stored in the computer memory, the computer may be readily programmed to compute the differences between force values furnished by the three probe devices, and to provide a signal representative of the vehicle velocity. Also, by comparing force component values as provided by the three strain-gages of any set thereof, the attitude of the vehicle relative to its trajectory or path is determinable by the computer. By means of the fact that the drag coefficient of a sphere varies from a value of .92 in a gasdynamic environment to a value of 2.0 in a free molecular flow environment (corresponding to 300,000 feet altitude above the earth), and utilizing the stored data in the computer memory and incoming values of force exerted on the several spheres of the probes, the mean free path in the gaseous environment is readily computed.

With the mean free path known (represented by computed values obtained by the computer and stored but constantly revised by the computer as it repeats its program) the altitude, ambient temperature, speed of sound, etc., are determined from tables of stored data by the computer, and appropriate signals furnished to the corresponding registering instruments, such as 62, 64, 66 and 88.

Computation of the vehicle velocity by the computer is based upon the known drag coefficient of one of the probe spheres, which value is stored in the memory. The air or gas density value is obtained from stored tabulations, and the velocity is computed as defined by the equation $$V = \sqrt{\frac{2F_D}{\rho A C_D}}$$

wherein $F_D$ is the indicated drag force on a sphere, in dynes; $\rho$ is the ambient-gas density; $A$ is the projected or frontal area of the sphere; and $C_D$ is the known sphere drag coefficient.

Mach number is computed by dividing the determined speed of sound into the determined velocity.

We claim:

1. Means for providing an indication of a physical quantity selected from the group including Mach number, attitude with respect to the path of movement, ambient gas temperature, and altitude above the surface of a planet, said means comprising: first means, comprising a plurality of $n$ spherical probes of differing diameters, and $n$ electrical three-dimensional strain-gage balance transducer means each in supportive relationship with a respective one of said spherical probes, said first means being constructed and arranged for sensing drag forces on said probes and for providing respective sets of signals each representing a force exerted upon the associated probe in a respective one of first, second and third mutually normal directions; second means, comprising a set of $n$ ratio detectors each connected to a respective one of said transducer means, for receiving a respective set of transducer signals and for producing therefrom a respective output signal representative of the resultant of the three component signals of the set; third means, comprising computer means including memory means having a memory and program control means and having a stored program and a reference data store representing sets of values of respective ones of said physical quantities corresponding to determined transducer output signals, said third means being connected to receive the output signals produced by said second means and being for comparing the received signals with memory-stored reference representations and for producing secondary output signals representative of equivalent input and stored representations; and fourth means, comprising a plurality of physical quantity indicators, for receiving a corresponding secondary output signal from said computer means and for providing in response thereto a sense-perceptible representation of a respective corresponding one of said physical quantities.

2. Apparatus for determining values of physical quantities including vehicle velocity, in a tenuous gaseous environment beyond the gasdynamic region, comprising: first means for sensing the forces due to vehicle movement through the gaseous environment, said first means including probe means comprising a plurality of spherical probes of at least two different diameters, and support means for the probes, said support means comprising respective tri-axial strain-gage means constructed and arranged for electrically indicating by respective electric signals the forces exerted in three mutually perpendicular directions on the respective sphere; second means for producing signals representative of vehicle movement through the gaseous environment, said second means being connected to said first means and including computer means comprising an information store having stored therein families of data relating to respective ones of said spheres and said computer means comprising an automatic program controller for causing the computer to repetitively receive samples of current indicating electric signals from said first means, and to compare the information represented by said electric signals with stored data to obtain a match between stored information and currently received information and to thereupon produce computer output signals representative of the values of the matched information; and third means, connected to said second means, for receiving the computer output signals and for translating at least one type of said computer output signals into a sense-perceptible indication of vehicle velocity.

3. In a space environment sensor, first and second spherical probe devices of differing diameters, first and second triaxial strain gage devices supporting respective ones of said probe devices whereby drag forces exerted on said probe devices incident to passage thereof through very tenuous gaseous environments at high altitudes are sensed by the respective strain gage devices, and means including detector means and computer means, connected to said strain gage devices and effective to provide physical indications of mean velocity of said devices along a line of motion followed by the devices.

4. A space environment sensor for a space vehicle, comprising in combination with such vehicle, first and second probe means comprising first and second spherical probes of different diameters, first and second triaxial strain gage supports supporting respective ones of said probe means and arranged to sense respective drag forces exerted upon respective ones of said probe means, and means connected to said strain gage supports and effective to produce a physical indication of the velocity of said vehicle incident to movement of the vehicle through a gaseous environment exhibiting granular flow of the constituent gas molecules.

5. A space environment apparatus adapted to provide physical indications of velocity of a space vehicle along a line of motion, comprising, in combination with such vehicle:

first and second spherical devices of different respective diameters for providing drag forces exerted thereon incident to movement through a gaseous medium;

support means including first and second sets of electrical strain gages each set of which is connected to and supports a respective one of said spherical devices and is adapted to sense all components of drag forces exerted on said spherical devices, said support means including means for supporting said strain gages in fixed relationship to said vehicle;

third means, comprising computer means connected to said strain gages, for receiving of signals representing components of drag forces sensed by the strain gages, said computer means including a computer memory with tabular information stored therein and said computer means being adapted to determine from stored information and from received signals from said strain gages the velocity of said vehicle along said path;

and fourth means, in communication with said third means, for providing a sense-perceptible indication of the determined velocity of said vehicle.

6. For a space environment sensor apparatus adapted to determine mean free distance of the molecules of the ambient gaseous medium in the ionosphere of the earth, drag force producing and sensing means including probe devices, for moving through a gaseous medium and producing signals representing drag forces produced on two different probe devices; and computer means connected to said drag force producing and sensing means and including a computer memory having stored therein tabular information including signal representations of drag forces and corresponding values of mean free distance between molecules of gas, for receiving the produced signals and therefrom determining the mean free distance of the molecules of the ambient gaseous medium.

References Cited by the Examiner
UNITED STATES PATENTS 2,855,779 10/1958 Zaid _____ 73—180
2,918,816 12/1959 Ormond _____ 73—88.5 X
2,985,014 5/1961 Doersam _____ 73—186 X LOUIS R. PRINCE, *Primary Examiner.*